US008478747B2

(12) United States Patent
Jeong et al.

(10) Patent No.: US 8,478,747 B2
(45) Date of Patent: Jul. 2, 2013

(54) SITUATION-DEPENDENT RECOMMENDATION BASED ON CLUSTERING

(75) Inventors: Sangoh Jeong, Palo Alto, CA (US); Hyuk Cho, Austin, TX (US); Doreen Cheng, San Jose, CA (US); Yu Song, Pleasanton, CA (US); Swaroop Kalasapur, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 846 days.

(21) Appl. No.: 12/134,143

(22) Filed: Jun. 5, 2008

(65) Prior Publication Data

US 2009/0307262 A1    Dec. 10, 2009

(51) Int. Cl.
*G06F 7/00* (2006.01)
*G06N 5/02* (2006.01)

(52) U.S. Cl.
USPC .......................................................... 707/723

(58) Field of Classification Search
USPC .... 707/736, 737, 758; 709/238, 225; 719/310
See application file for complete search history.

(56) References Cited

U.S. PATENT DOCUMENTS

| | | | | |
|---|---|---|---|---|
| 6,848,104 | B1 * | 1/2005 | Van Ee et al. ................. | 719/310 |
| 7,174,343 | B2 | 2/2007 | Campos et al. | |
| 7,251,637 | B1 | 7/2007 | Caid et al. | |
| 2001/0014868 | A1 * | 8/2001 | Herz et al. ..................... | 705/14 |
| 2003/0043815 | A1 * | 3/2003 | Tinsley et al. ........... | 370/395.21 |
| 2003/0187984 | A1 * | 10/2003 | Banavar et al. ............... | 709/225 |
| 2004/0220963 | A1 | 11/2004 | Chen et al. | |
| 2005/0182852 | A1 * | 8/2005 | Tinsley et al. ................ | 709/238 |
| 2005/0234973 | A1 | 10/2005 | Zeng et al. | |
| 2007/0174267 | A1 | 7/2007 | Patterson et al. | |
| 2007/0271266 | A1 | 11/2007 | Acharya et al. | |
| 2009/0063537 | A1 * | 3/2009 | Bonnefoy-Cudraz et al. ........................... | 707/102 |

OTHER PUBLICATIONS

Equitz, "A new vector quantization clustering algorithms", Oct. 1989.*
Deshpande et al. "Item-based top-n recommendation algorithms." In Proc. of IEEE MDM '06, 2006.
Herlocker et al., "An Algorithmic Framework for Performing Collaborative Filtering."In Proc. of SIGIR, 1999.
Linde et al. "An algorithm for vector quantizer design." IEEE Transactions on Communications, vol. Com-28, No. 1, Jan. 1980.

(Continued)

*Primary Examiner* — Hung T Vy
(74) *Attorney, Agent, or Firm* — Kenneth L. Sherman, Esq.; Michael Zarrabian, Esq.; Sherman & Zarrabian LLP

(57) ABSTRACT

Data relating to usage patterns of the user is stored, wherein the data includes an application portion having information as to items which were used and a context portion having information as to the context in which the items were used. The data is clustered into clusters of data points and centroid are computed, wherein the centroid includes an application portion and a context portion. Clusters similar to a current context of the user are selected by comparing a data point representing the current context of the user to the context portions of one or more of the centroids. For each of one or more items, a expectation value that the user wishes to use the corresponding item is computed, based on the application portions of the selected similar clusters, wherein the expectation values are used to recommend one or more of the items.

22 Claims, 9 Drawing Sheets

OTHER PUBLICATIONS

Oku et al. "Context-aware SVM for context-dependent information." Proceedings of the 7th International Conference on Mobile Data Management (MDM '06), 2006.

Rack et al. "Context-aware, ontology-based recommendation." Proceedings of the International Symposium on Applications and the Internet Workshops (SAINTW '06), 2005.

Ricci et al. "Acquiring and revising preferences in a critique-based mobile recommender system." IEEE Computer Society, 2007.

Woerndl et al. "A hybrid recommender system for context-aware recommendations of mobile applications." IEEE 2007.

Woerndl et al. "Utilizing physical and social context to improve recommender systems." IEEE International Conferences on Web Intelligence and Intelligent Agent Technology Workshops, 2007.

Zhang et al. "Spontaneous and context-aware media recommendation in heterogeneous spaces." IEEE 2007.

Mobasher et al. "Semantically Enhanced Collaborative Filtering on the Web." AAI Workshop on Semantic Web Personalization (SWP 2004).

Leung et al. "Applying Cross-Level Association Rule Mining to Cold-Start Recommendation/" Web Intelligence and Intelligent Agent Technology, 2007.

Szomszor et al. "Folksonomies, the Semantic Web, and Movie Recommendations," 4th European Semantic Web Conference, 2007.

Park et al. "Naïve Filterbots for Robust Cold-Start Recommendations," KDD 2006.

Good et al. "Combining Collaborative Filtering with Personal Agents for Better Recommendations," AAAI/IAAI, 1999.

Chen et al., "A Survey of Context-Aware Mobile Computing Research," Dartmouth Computer Science Technical Report TR2000-381, Dartmouth College, 2000.

Notice of Allowance dated Mar. 9, 2011 from U.S. Appl. No. 12/371,419.

Lei et al., "Applying Situation Awareness to Mobile Proactive Information Delivery," Lecture Notes in Computer Science, 2007, vol. 4809/2007, pp. 592-603.

John A. Flanagan, "Unsupervised Clustering of Context Data and Learning User Requirements for a Mobile-Device", 5th Intl' and Interdisp. Conf. on Modeling and Using Context (CONTEXT-05), pp. 155-168, 2005.

J. B. MacQueen, "Some Methods for Classification and Analysis of Multivariate Observations", Proceedings of 5th Berkeley Symposium on Mathematical Statistics and Probability, Berkeley, University of California Press, pp. 281-297, 1967.

Hyuk Cho et al., "Minimum Sum-Squared Residue Co-clustering of Gene Expression Data", Proceedings of the Fourth SIAM International Conference on Data Mining (SDM), pp. 114-125, Apr. 2004.

Allen Gersho et al., "Random Processes and Linear Systems" (Chapter 2), pp. 19-47, Vector Quantization and Signal Compression, 1992, Kluwer Academic Publishers, Second Printing, 1993.

Allen Gersho et al., "Sampling" (Chapter 3), pp. 51-81, Vector Quantization and Signal Compression, 1992, Kluwer Academic Publishers, Second Printing, 1993.

Allen Gersho et al., "Linear Prediction" (Chapter 4), pp. 85-129, Vector Quantization and Signal Compression, 1992, Kluwer Academic Publishers, Second Printing, 1993.

S.C. Madeira, A. L. Oliveira, "Biclustering Algorithms for Biological Data Analysis: A SUI-vey," IEEE Transactions on Computational Biology and Bioinformatics, vol. 1, Issue 1, pp. 24-45, 2004.

* cited by examiner

| 100 | 102 | 104 | 106 | 108 | 110 |
|---|---|---|---|---|---|
| Time | Loc. | Temp | Email | Web | Note |

FIG. 1

SITUATION-DEPENDENT RECOMMENDATION BASED ON CLUSTERING

BACKGROUND OF THE INVENTION

1. Field of the Invention

The present invention relates to software applications. More particularly, the present invention relates to the situation-dependent recommendation based on clustering.

2. Description of the Related Art

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, a mobile phone or cell phone can be a long-range, portable electronic device used for mobile communication. In addition to the standard voice function of a telephone, current mobile phones can support many additional services such as Short Message Service (SMS) for text messaging, email, packet switching for access to the Internet, and Multimedia Messaging Service (MMS) for sending and receiving photos and video. Most current mobile phones connect to a cellular network of base stations (cell sites), which is in turn interconnected to the public switched telephone network (PSTN) (one exception is satellite phones).

SMS, often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mail. Its main standardization effort is done by 3GPP, 3GPP2 and Open Mobile Alliance (OMA).

There are many circumstances in which it would be beneficial for a computer or other electronic device to be able to recommend software applications or other items for a user to download, install, and/or utilize in other ways. Once such circumstance is where the user is operating a mobile device. The display and interface limitations of such devices make it difficult for users to perform significant searching for applications using them. For example, a user may be shopping and desire to utilize a price comparison software application on his mobile device. However, it would be difficult for the user to navigate the Internet and/or a directory of available software applications using the mobile device. In such cases, it would be beneficial to recommend to the user a small set of software applications.

SUMMARY OF THE INVENTION

In one embodiment, a method for making recommendations to a user is provided. Data relating to usage patterns of the user is stored, wherein the data includes an application portion having information as to items which were used and a context portion having information as to the context in which the items were used. The data is clustered into clusters of data points. For each of the clusters, a centroid is computed, wherein the centroid includes an application portion and a context portion. Clusters similar to a current context of the user are then selected by comparing a data point representing the current context of the user to the context portions of one or more of the centroids. For each of one or more items, an expectation value that the user wishes to use the corresponding item is computed, based on the application portions of the selected similar clusters, wherein the expectation values are used to recommend one or more of the items.

In another embodiment, another method for making recommendations to a user is provided. Data relating to usage patterns of the user is stored, wherein the data includes an application portion having information as to items which were used and a context portion having information as to the context in which the items were used. The data is clustered into clusters of data points. For each of the clusters, a centroid is computed, wherein the centroid includes an application portion and a context portion. Clusters similar to a current context of the user are then selected by comparing a data point representing the current context of the user and the current items(s) being used to the context portions and application portions of one or more of the centroids. For each of one or more items, an expectation value that the user wishes to use the corresponding item is computed, based on the application portions of the selected similar clusters, wherein the expectation values are used to recommend one or more of the items.

In another embodiment, an apparatus is provided comprising: an interface; and one or more processors configured to: store data relating to usage patterns of the user, wherein the data includes an application portion having information as to items which were used and a context portion having information as to the context in which the items were used; cluster the data into clusters of data points; compute, for each of the clusters, a centroid, wherein the centroid includes an application portion and a context portion; select clusters similar to a current context of the user by comparing a data point representing the current context of the user to the context portions of one or more of the centroids; compute, for each of one or more items, an expectation value that the user wishes to use the corresponding item, based on the application portions of the selected similar clusters, wherein the expectation values are used to recommend one or more of the items.

In another embodiment, an apparatus is provided comprising: an interface; and one or more processors configured to: store data relating to usage patterns of the user, wherein the data includes an application portion having information as to items which were used and a context portion having information as to the context in which the items were used; cluster the data into clusters of data points; compute, for each of the clusters, a centroid, wherein the centroid includes an application portion and a context portion; select clusters similar to a current context of the user by comparing a data point representing the current context of the user and the current items(s) being used to the context portions and application portions of one or more of the centroids; compute, for each of one or more items, an expectation value that the user wishes to use the corresponding item, based on the application portions of the selected similar clusters, wherein the expectation values are used to recommend one or more of the items.

In another embodiment, a system for making recommendations to a user is provided, the system comprising: means for storing data relating to usage patterns of the user, wherein the data includes an application portion having information as to items which were used and a context portion having information as to the context in which the items were used; means for clustering the data into clusters of data points; means for computing, for each of the clusters, a centroid, wherein the centroid includes an application portion and a context portion; means for selecting clusters similar to a current context of the user by comparing a data point representing the current context of the user to the context portions of one or more of the centroids; means for computing, for each of one or more items, an expectation value that the user wishes to use the corresponding item, based on the application portions of the selected similar clusters, wherein the expectation values are used to recommend one or more of the items.

In another embodiment, another system for making recommendations to a user is provided, the system comprising: means for storing data relating to usage patterns of the user, wherein the data includes an application portion having information as to items which were used and a context portion having information as to the context in which the items were used; means for clustering the data into clusters of data points; means for computing, for each of the clusters, a centroid, wherein the centroid includes an application portion and a context portion; means for selecting clusters similar to a current context of the user by comparing a data point representing the current context of the user and the current items(s) being used to the context portions and application portions of one or more of the centroids; means for computing, for each of one or more items, a expectation value that the user wishes to use the corresponding item, based on the application portions of the selected similar clusters, wherein the expectation values are used to recommend one or more of the items.

In another embodiment, A program storage device readable by a machine tangibly embodying a program of instructions executable by the machine to perform a method for making recommendations to a user is provided, the method comprising: storing data relating to usage patterns of the user, wherein the data includes an application portion having information as to items which were used and a context portion having information as to the context in which the items were used; clustering the data into clusters of data points; computing, for each of the clusters, a centroid, wherein the centroid includes an application portion and a context portion; selecting clusters similar to a current context of the user by comparing a data point representing the current context of the user to the context portions of one or more of the centroids; computing, for each of one or more items, an expectation value that the user wishes to use the corresponding item, based on the application portions of the selected similar clusters, wherein the expectation values are used to recommend one or more of the items.

In another embodiment, another program storage device readable by a machine tangibly embodying a program of instructions executable by the machine to perform a method for making recommendations to a user, the method comprising: storing data relating to usage patterns of the user, wherein the data includes an application portion having information as to items which were used and a context portion having information as to the context in which the items were used; clustering the data into clusters of data points; computing, for each of the clusters, a centroid, wherein the centroid includes an application portion and a context portion; selecting clusters similar to a current context of the user by comparing a data point representing the current context of the user and the current items(s) being used to the context portions and application portions of one or more of the centroids; computing, for each of one or more items, an expectation value that the user wishes to use the corresponding item, based on the application portions of the selected similar clusters, wherein the expectation values are used to recommend one or more of the items.

BRIEF DESCRIPTION OF THE DRAWINGS

FIG. 1 is a diagram illustrating an example vector storing context and usage information for a single data point.

DETAILED DESCRIPTION OF SPECIFIC EMBODIMENTS

Figure 2:
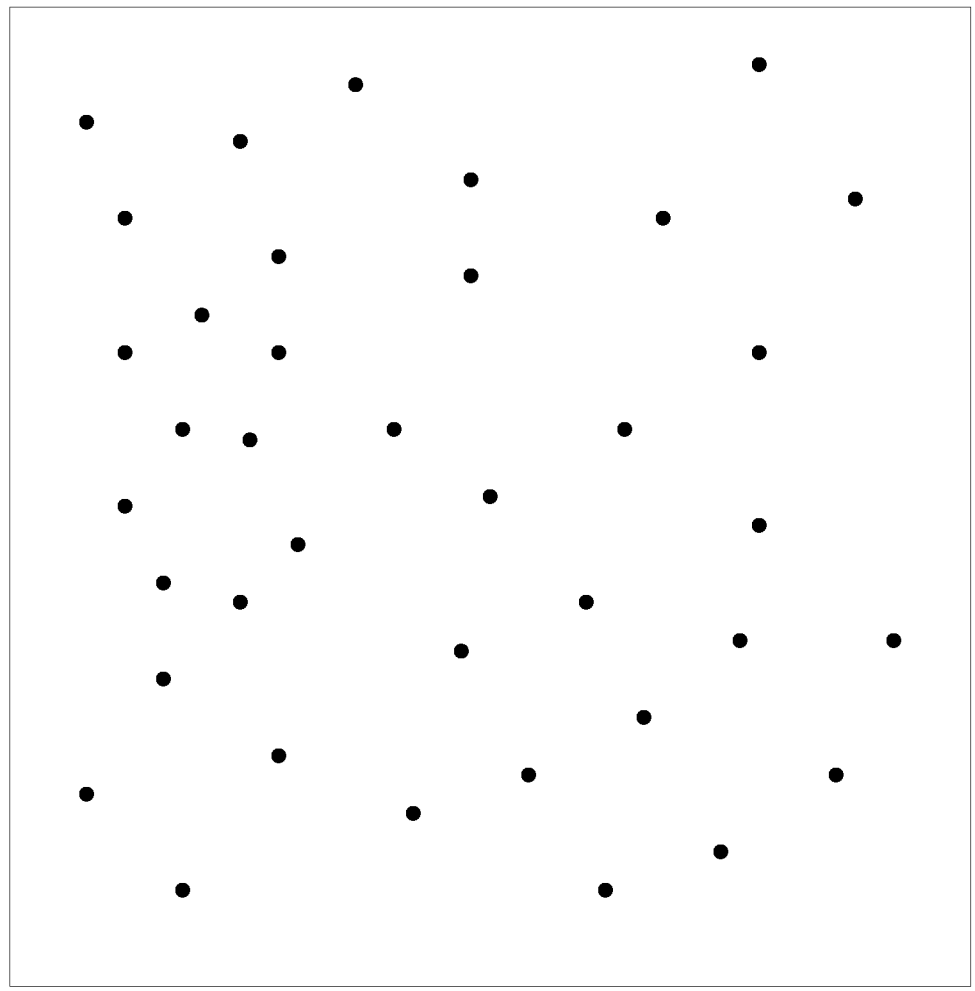
FIG. 2 is a diagram illustrating an example graph.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, software applications or other items may be automatically recommended to the user based on data related to the current context and past usage information. Context refers to the situation in which the user and/or device the user is operating. For example, the context may include the location of the user—whether the user is home, at the office, or elsewhere. The context may also include the time of day—for example, whether it is morning, afternoon, or evening. One of ordinary skill in the art will recognize that there may be many other types of information captured by the context and nothing in this document shall be read as limiting the invention to any particular type of information.

One way for a system to provide software recommendations would be to let a user specify his or her preferences, and use the preferences to guide application/service recommendations. For example, a user may indicate a preference for business-related software, and the system may use this information to err on the side of recommending business-related software applications. Thus, for example, if the choice is between a game application and a word processing application, the system would recommend a word processing application. This solution, however, suffers from the drawback that user studies have shown that few users would bother to specify preferences, as such there is simply no data from which to extract such a recommendation. Furthermore, even when preferences are specified, user preferences are usually situation-dependent, i.e., a user's preferences vary from situation to situation. For example, while a user may have a preference for business-related software while at work or during the daytime, the same user may have a preference for entertainment-related software while at home. In another example, at evening at home on a rainy day, the user may want to cook dinner and watch news, and may prefer software applications related to those tasks, while at a similar time at the office and in a meeting, the user may want to call home and arrange for food to be picked up on the way home. The preference-based approach to recommendations, used alone, simply does not provide the level of granularity needed to be effective for real-world uses.

Other approaches require the user to effectively train the device over a period of time ("supervised training"). However, supervised training may not be an ideal or a desired solution for many applications as it requires the use to spend a significant amount of time and effort to actively train the device. Another drawback is that conventional approaches are not flexible and do not readily adapt to changes in preferences, environment, or habits associated with the use of the device. Therefore, improved techniques for enhancing mobile devices and/or their use are needed.

As such, in an embodiment of the present invention, context information is captured and utilized in the application-recommending process. Data relating to previous usage information may be collected and stored as data points. The data point information may be stored in vectors. FIG. 1 is a diagram illustrating an example vector storing context and usage information for a single data point. In this example, context information includes time 100, location 102, and temperature 104. Usage information indicates which applications the user operated, including email 106, web browsing 108, and notepad 110.

Each data point may also be visualized as a point on a two-dimensional graph. FIG. 2 is a diagram illustrating an example graph. The proximity of data points to one another on the graph indicates the level of similarity of their vectors. In an embodiment of the present invention, these data points may be grouped into clusters of similar data points. Clustering is the classification of objects into different groups, or more precisely, the partitioning of a data set into subsets (clusters), so that the data in each subset (ideally) share some common trait—often proximity according to some defined distance measure. These clusters may then be utilized in aiding the system select appropriate applications to recommend.

Figure 3:
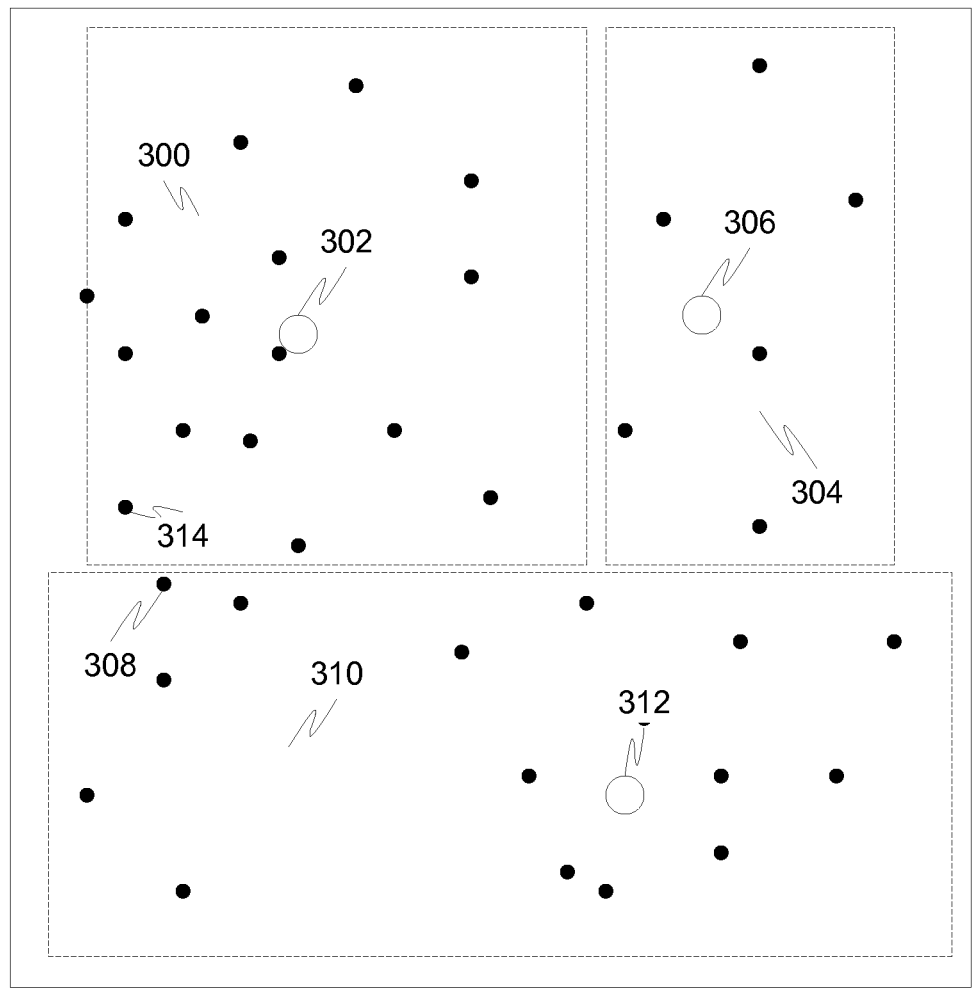
FIG. 3 is an example of the graph with the data points clustered.

One way to cluster the data points is to attempt to determine the optimum number of clusters for a given set of data points. This optimum number is known as K. There are a number of traditional techniques for making this determination, all of which are beyond the scope of this application. There are numerous drawbacks to this approach, however. K must be determined dynamically, and as such requires significant processing power, processing power that may be lacking in mobile devices. Additionally, k can be very difficult to determine with any degree of accuracy, and an incorrect guess can negatively impact both the clustering and recommendation accuracy. Given the partitioned clusters, one way to extract patterns is to compare the current data point with each of the cluster centroids and determine to which cluster the current data point belongs. The application patterns are then extracted from this cluster. For n-dimensional structures, a centroid is an intersection of all hyperplanes that divide X into two parts of equal moment about the hyperplane. Informally, it is the "average" or "mean" of all points of X. Thus, a centroid of a cluster is the mean of all points in the cluster. FIG. 3 is an example of the graph with the data points clustered. Cluster 300 has centroid 302 and Cluster 304 has centroid 306.

Comparing the centroids, however, may create a situation where certain neighboring data points may not be selected as one of the k neighboring data point, despite being close to the current data point, simply because they are part of clusters whose centroid is farther from the current data point than other centroids. One instance of such a case is depicted in FIG. 3, where data point 308 is part of cluster 310. Data point 308 is closer to cluster 300 than any of the data points in cluster 304, yet because the centroid 312 of cluster 310 is farther from the centroid 302 of cluster 300 than the centroid 306 of cluster 304, data point 308, despite being arguably the most similar to a relevant data point 314 in cluster 300, may not be used in the analysis.

In contrast to clustering, another way to extract patterns is to group neighboring data points nearest to the current data point. The nearest neighbors are those that are most similar to the current contexts and application usages. The application patterns are then extracted from these neighboring instances. This approach, however, requires that all of the existing data points be compared in order to find the neighbors, and thus is also not suitable for online computation on resource-limited devices such as mobile In an embodiment of the present invention, rather than estimating an "optimal" number of clusters before starting the clustering process, the number of clusters is dynamically chosen. Additionally, the number is chosen so as to result in compact (i.e., small) clusters. A threshold may be selected for the maximum number of points in a cluster and the clusters may be divided so that no cluster exceeds this threshold. In an alternative embodiment, rather than an upper threshold, a number representing the average number of points in a cluster may be selected and the data points clustered so that each cluster has at or near that number of data points. For example, if 5 is the average number of data points in each resulting cluster, and there are 3000 total data points in the usage data, then the data may be clustered into 600 clusters. Then, for each cluster, a centroid is computed and stored along with its containing data point. The compactness of a cluster may be measured by the average Euclidean distance from the data points in a cluster to the cluster's centroid. The smaller the average, the more compact a cluster is. The advantage of this approach is that, because the clusters are compact, the centroids better represents the data points in the corresponding clusters. This approach also does not require the resource-intensive task of deriving an optimal number for K.

In an embodiment of the present invention, both the context part and usage part of a vector are used as input to a clustering algorithm. The result of this is a set of clusters wherein the centroid of each cluster contains a context part and a usage part. The context part of the centroid may be utilized for situation recognition. Specifically, the context part may be used to compare with the user's current context to identify clusters similar to the user's current context. The usage part may be used to compare with the items the user is currently utilizing (e.g., currently running applications) to identify clusters similar to the user's current usage.

In other words, the context part may be utilized to identify clusters based on the user's current context while the usage part may be utilized to identify clusters based on the user's current usage of items. In one embodiment, both are used together.

When a new point comes in (i.e., a recommendation is to be made based on a current context), then this data point may be compared to the k closest neighboring centroids, rather than all of the data points. This greatly reduces the processing required to make the recommendation as it is no longer necessary to compare each individual data point to the new data point in order to derive accurate recommendations.

Figure 4:
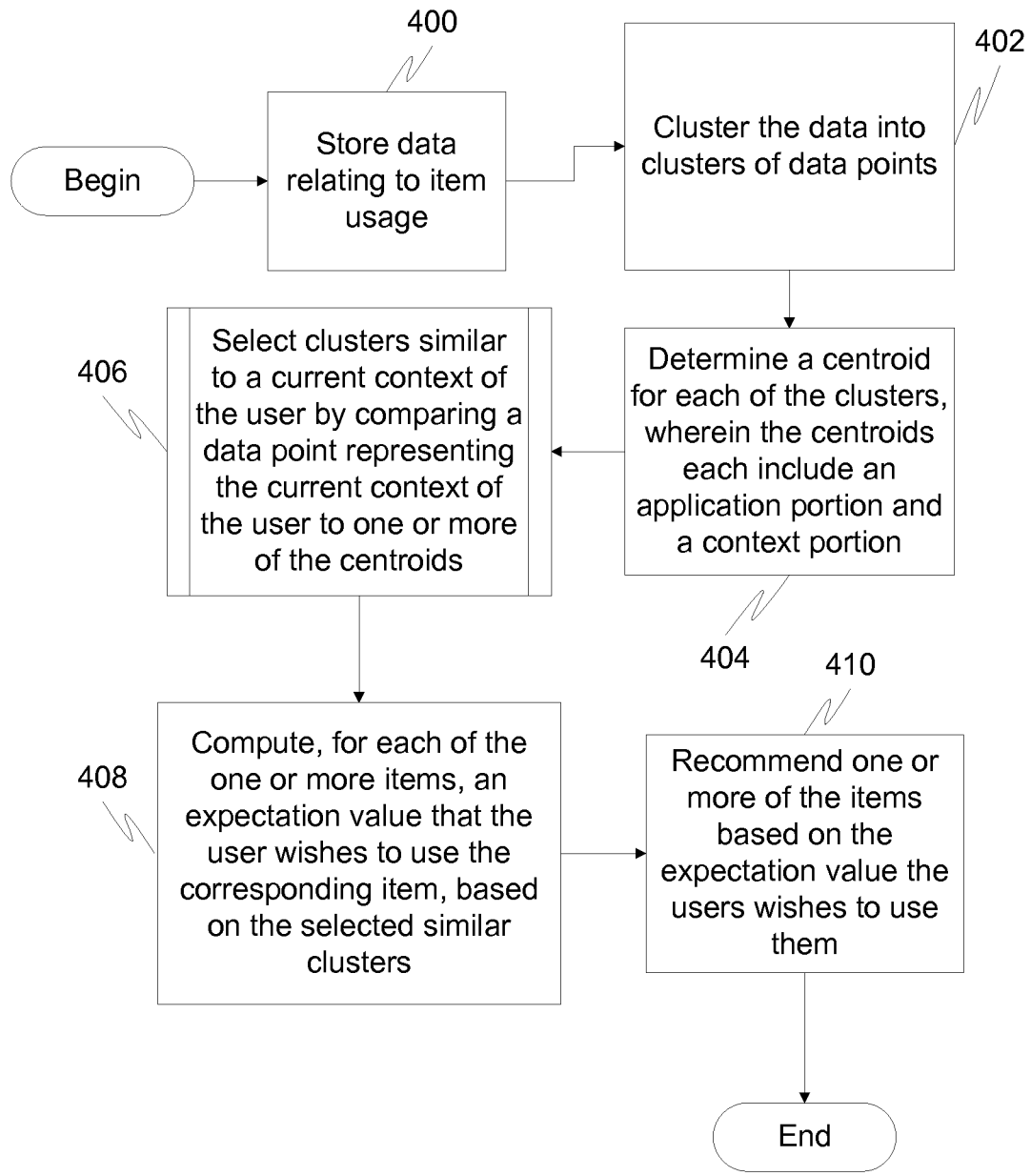
FIG. 4 is a flow diagram illustrating a method for making recommendations to a user in accordance with an embodiment of the present invention.

FIG. 4 is a flow diagram illustrating a method for making recommendations to a user in accordance with an embodiment of the present invention. Each step in this method may be embodied in hardware, software, or any combination thereof. The user may be utilizing an electronic device. This device may be a stationary device, such as a desktop computer, or may be a mobile device, such as a mobile phone, PDA, or laptop computer. One of ordinary skill in the art will recognize that other types of devices may be used with the present invention, and that nothing in this document shall be interpreted as limiting the device to any particular implementation.

At step 400, data relating to item usages of the user is stored. This data includes information as to items which were used by the user and the context in which they were used. The items may include any items that the user may find getting recommendations on as helpful. In one embodiment of the present invention, the items may include software applications running on the device. Thus, the user may find it helpful to receive recommendations on other, perhaps non-running, applications so that the user does not download, install, or run applications that have only a low probability that the user may be interested in them. In another embodiment of the present invention, the items may include computing services. This may include, for example, applications that run on other devices, such as remote games, diagnostic services, or anti-virus services. In another embodiment of the present invention, the items may include other information, such as, for example, movies, web sites, music, etc. One of ordinary skill in the art will recognize that many different types of objects may be recommended using various embodiments of the present invention. This usage data may be stored in, for example, vectors. The vectors may contain contexts concatenated with application usage values.

At step 402, the data is clustered into clusters of input data points. The actual clustering may be accomplished using a variety of clustering techniques. In one embodiment, k-means clustering may be utilized. In k-means clustering, a system assigns each point to the cluster whose centroid is nearest. Thus, this procedure becomes:

(1) Randomly generate k clusters and determine the cluster centers, or directly generate k random points as cluster centers.

(2) Assign each point to the nearest cluster center.

(3) Recompute the new cluster centers.

(4) Repeat the two previous steps until some convergence criterion is met (usually that the assignment hasn't changed).

The main advantages of using k-means clustering are its simplicity and speed which allows it to run on large datasets. Its disadvantage is that it does not yield the same result with each run, since the resulting clusters depend on the initial assignments Another possible clustering technique is the use of co-clustering. Given a multi-dimensional data matrix, co-clustering refers to simultaneous clustering along multiple dimensions. Thus, for example, not only the objects are clustered but also the features of the objects, i.e., if the data is represented in a data matrix, the rows and columns are clustered simultaneously. In a two-dimensional case it is simultaneous clustering of rows and columns, in contrast to clustering along a single dimension. Co-clustering has the advantage of handling sparse data points better.

Yet another possible clustering technique is vector quantization. Vector quantization is a technique borrowed from signal processing that allows the modeling of probability density functions by the distribution of prototype vectors. It works by dividing a large set of points (vectors) into groups having approximately the same number of points closest to them. Each group is represented by its centroid point, as in k-means and some other clustering algorithms.

One of ordinary skill in the art will recognize that there are other clustering techniques that can be used in the present invention. Nothing in this document shall be construed as requiring the use of any particular clustering technique.

In one embodiment of the present invention, both the context part and the application part of a vector are used as input to a clustering algorithm. This may be called "combined clustering." As will be seen later, this enables improved situation recognition performance by exploiting application usage patterns as well as context. A situation can be defined as a cluster of similar patterns of both contexts and applications.

At step 404, a centroid is determined for each of the clusters. When dealing with embodiments where both the context part and the application part of the vector were feed as input to the clustering algorithm, the result of this step will be centroids that each contain both an application portion and a context portion.

At step 406, clusters similar to a current context of the user are selected by comparing a data point representing the current context of the user to one or more of the centroids. In one embodiment of the present invention, the data point is compared to the centroids of each of the clusters. This comparison may include a series of steps.

Figure 5:
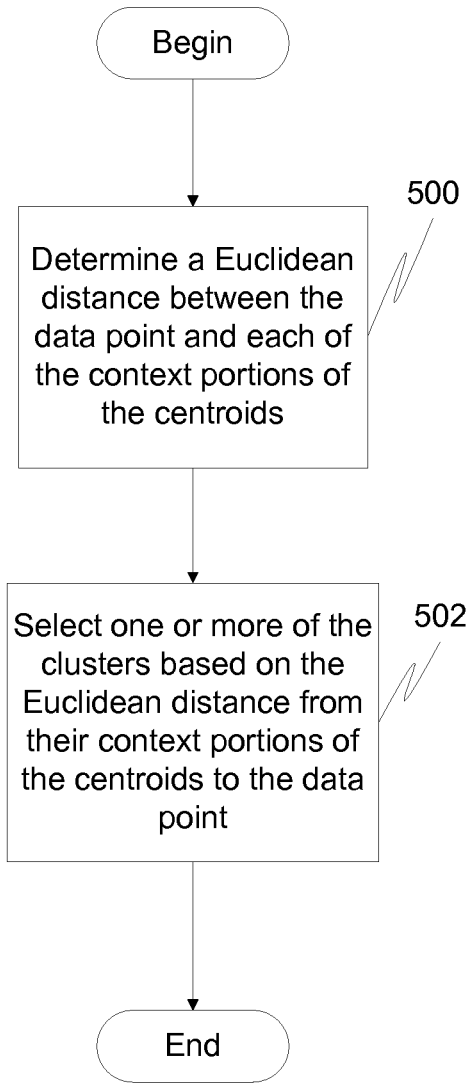
FIG. 5 is a flow diagram illustrating a method for selecting clusters similar to a current context of a user by comparing a data point representing the current context of the user to one or more of the context portions of centroids in accordance with an embodiment of the present invention.

In cases where the centroids and vectors each have an application portion and a vector portion, these steps may involve either comparing just the context parts of the centroids and vectors, or comparing both the context and application parts. FIG. 5 is a flow diagram illustrating a method for selecting clusters similar to a current context of a user by comparing a data point representing the current context of the user to one or more of the context portions of centroids in accordance with an embodiment of the present invention. Each step of this method may be embodied in software, hardware, or any combination thereof. At 500, a Euclidean distance between the data point and each of the context portions of centroids may be determined. Various techniques exist for quickly and efficiently computing the Euclidean distance between data points. Such techniques are outside the scope of this disclosure, but one of ordinary skill in the art will recognize that any such technique may be utilized.

At 502, one or more of the clusters may be selected based on the Euclidean distance from their centroids to the data point. The closest centroids to the data point represent the most similar clusters to the data point.

Figure 6:
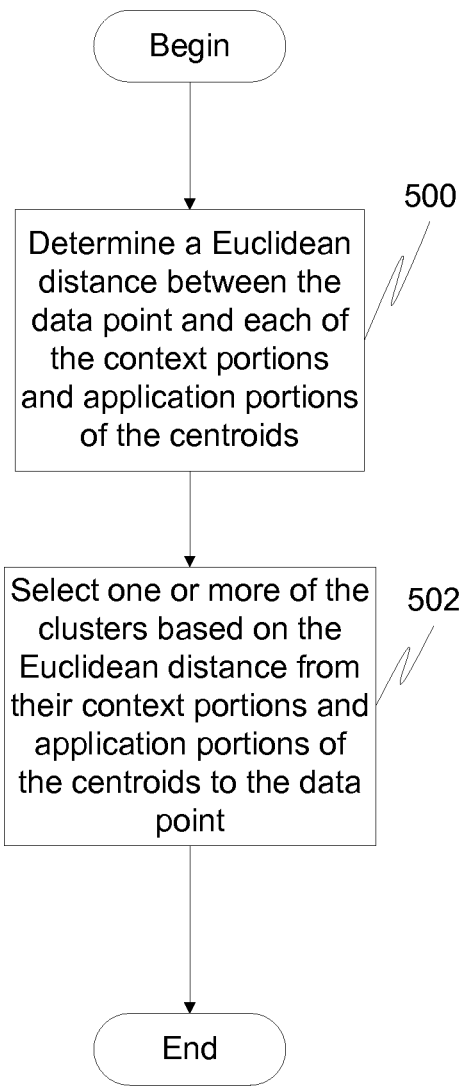
FIG. 6 is a flow diagram illustrating a method for selecting clusters similar to a current context of a user by comparing a data point representing the current context and the current application of the user to one or more of the context portions and application portions of centroids in accordance with an embodiment of the present invention.

FIG. 6 is a flow diagram illustrating a method for selecting clusters similar to a current context of a user by comparing a data point representing the current context and the current application of the user to one or more of the context portions and application portions of centroids in accordance with an embodiment of the present invention. Each step of this method may be embodied in software, hardware, or any combination thereof. At 600, a Euclidean distance between the data point and each of the context portions and application portions of centroids may be determined. Various techniques exist for quickly and efficiently computing the Euclidean distance between data points. Such techniques are outside the scope of this disclosure, but one of ordinary skill in the art will recognize that any such technique may be utilized.

At 602, one or more of the clusters may be selected based on the Euclidean distance from their context and application portions of the centroids to the data point. The closest centroids to the data point (based on the context and application portions) represent the most similar clusters to the data point. How many of these closest clusters are selected may be determined by utilizing a pre-set maximum for the number of data points to be collected. For example, a system administrator may indicate a maximum of 30 data points for similar clusters. If each cluster has 10 data points, then the system may select the three clusters having the closest centroids to the data point representing the current context of the user.

It should be noted that the Euclidean distance is merely one way of comparing portions of clusters to data points. The invention shall not be deemed to be limited to use of Euclidean distance measurements for this purpose. Other embodiments are possible using, for example, L-p norm or quadratic distance.

Referring back to FIG. 4, once the one or more similar clusters have been selected, at 408 the system computes, for each of one or more items, an expectation value that the user wishes to use the corresponding item, based on the selected similar clusters. The expectation value reflects the chances that the user will wish to use the corresponding item. One of ordinary skill in the art will recognize that this may be accomplished in many different ways. One way is to compute a centroid vector of the data points in the selected clusters. The centroid vector then represents the expectation value of usage pattern for each item.

At step 410, one or more of the items may be recommended based on the expectation value that the user wishes to use them. The number of items to recommend may be determined in a number of different ways.

In one embodiment, the system recommends x items having the highest expectation values that the user wishes to use them, wherein x is dynamically determined by using the average number of items that have been used in the selected clusters. In another embodiment of the present invention, x is simply a preset value selected by an administrator.

Figure 7:
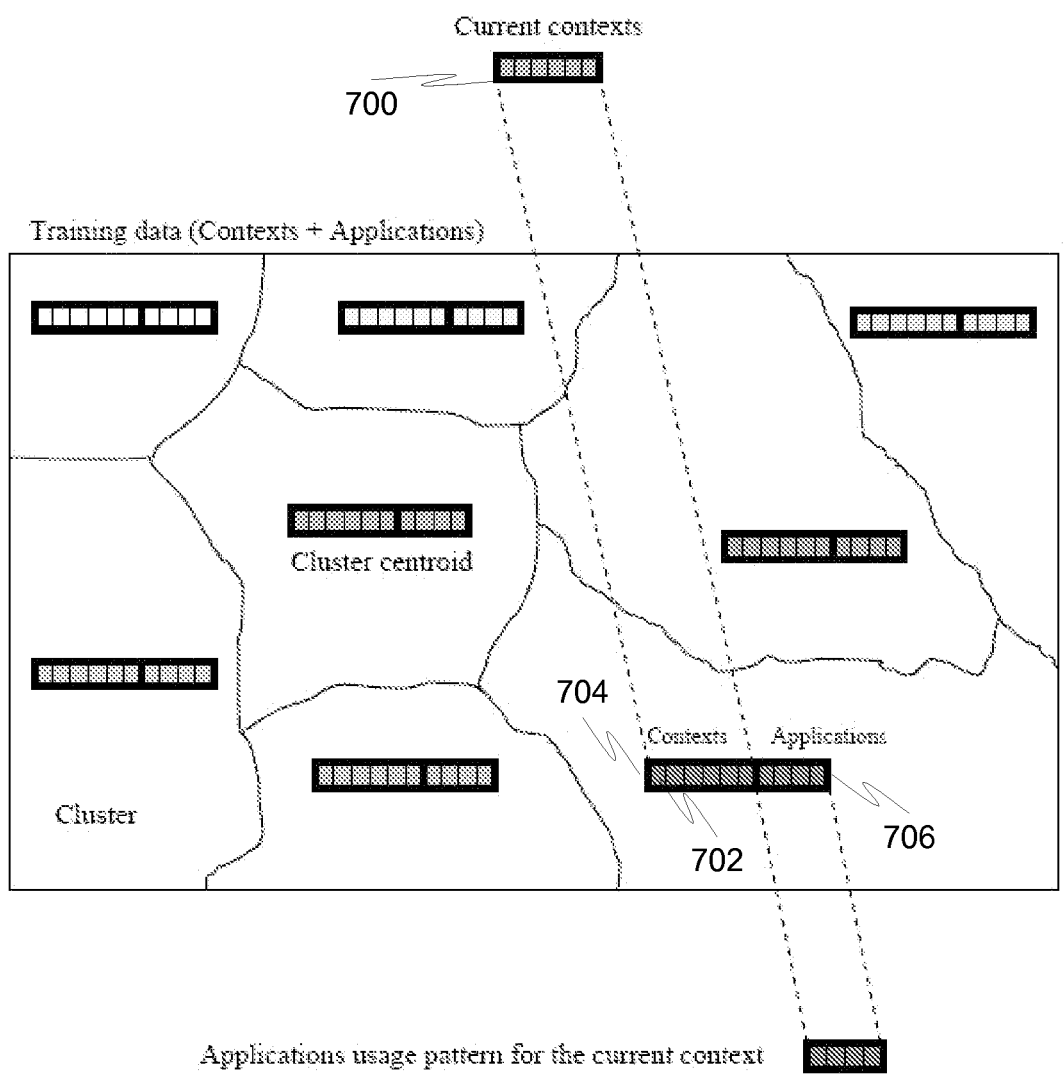
FIG. 7 is a diagram illustrating application centroid selection using only the current context, based on clustering of both context and applications, in accordance with an embodiment of the present invention.

In another embodiment of the present invention, a threshold is computed for each possible item to be recommended. This computation may be performed at the recommendation stage FIG. 7 is a diagram illustrating application centroid selection using only the current context, based on clustering of both context and applications, in accordance with an embodiment of the present invention. Here, the current context 700 is compared with the context part 702 of centroids 704. The application parts 706 of the closest centroids 704 are then used as candidate applications for recommendation.

Figure 8:
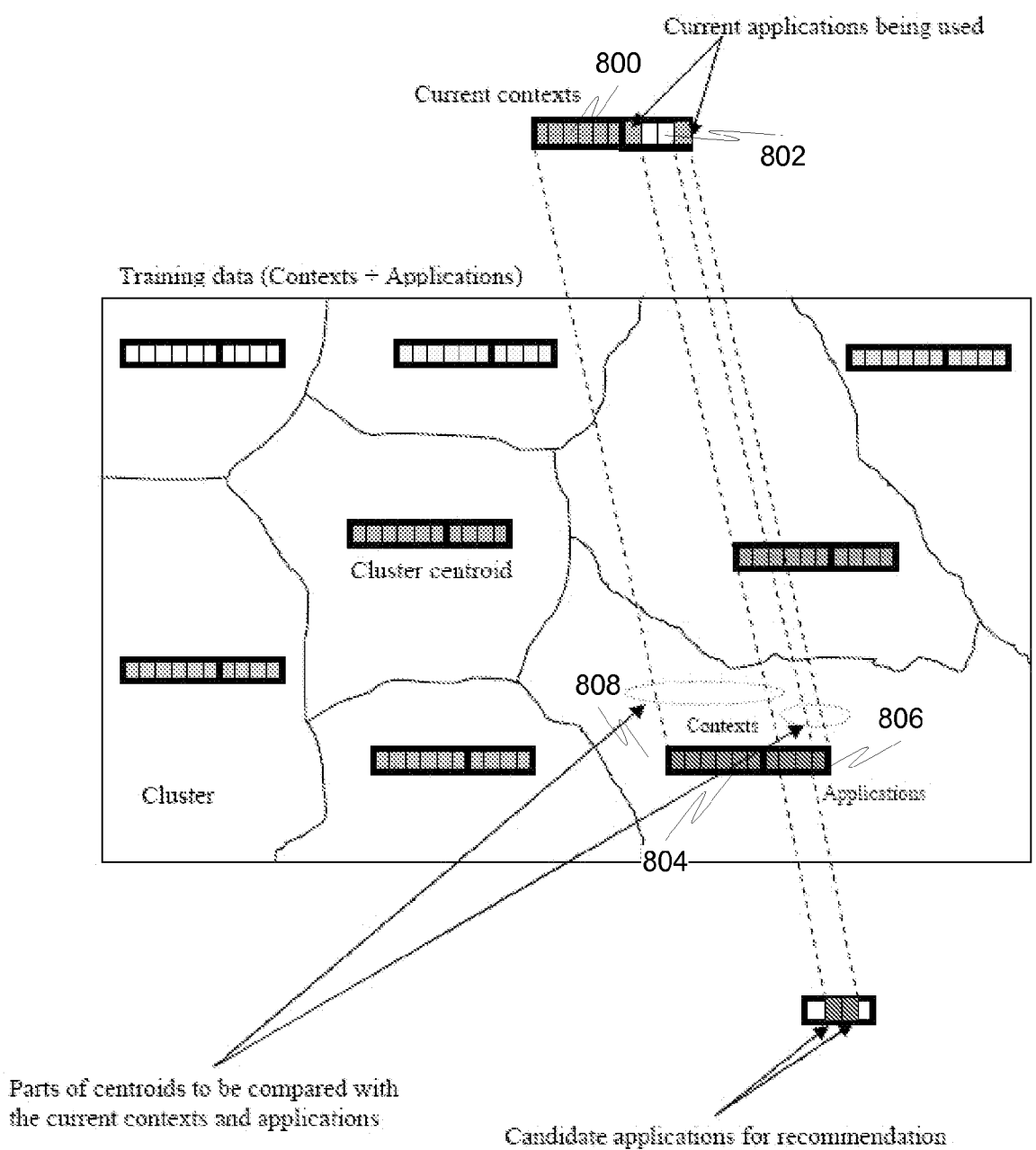
FIG. 8 is a diagram illustrating application centroid selection with both the current contexts and application usages, based on clustering of both contexts and applications, in accordance with another embodiment of the present invention.

FIG. 8 is a diagram illustrating application centroid selection with both the current contexts and application usages, based on clustering of both contexts and applications, in accordance with another embodiment of the present invention. Here, the current context 800 and application usage 802 are compared with the context part 804 and application part 806 of centroids 808. The application parts 806 of the closest centroids 808 are then used as candidate applications for recommendation.

It should be noted that the computing and recommending steps would typically be performed only for items that are not currently being used by the user—the thought being that a user does not typically need a recommendation on an item to use if the user is already using it. However, there may be circumstances where it is beneficial to recommend an application to a user that is already being used. As such, nothing in this application shall be construed as limiting the recommendations to non-running items or items otherwise not being used, unless language is presented explicitly stating so.

It should also be noted that, in order to increase computing efficiency, it may be desirable to perform some of the steps of the method of FIGS. 4-7 during a device's idle time (offline). More specifically, in instances where the user's device is not being used or is lightly used, it becomes beneficial to perform some of the operations described above to maximize the availability of a processor of the user's device and to reduce the response time when the actual recommendation is requested (online).

Many of the steps involved in the gathering and clustering of the data itself can be performed while offline.

In another embodiment of the present invention, the probability-based solution described above may be combined with other techniques to improve the recommendation process. For example, a solution based on user-selected preferences was previously described in this document. While such a solution is very limited when utilized alone, if such a preference-based solution were combined with the probability-based solution described above, it may act to improve upon either solution operated alone. Such a solution might involve, for example, weighting the probabilities determined for a given context based upon the user preferences. For example, in a previously presented example, the probability that the user might wish to run a word processing application while at work and in the morning was listed at 0.89. However, perhaps this particular user prefers to play game applications while at work in the morning, because the user's boss does not come into work until the afternoon. If the user indicated that fact by providing a preference for game applications, the probability that the user might wish to run a word processing application may be reduced (or the probability that the user might wish to run a game application may be increased) by a weighting. In another embodiment of the present invention, the preferences may even be granularized to the same level as the tracked contexts, such that the user could expressly indicate a fondness for game applications while at work and during the mornings.

In an alternative combination of the probability-based solution and preference-based solution, the system may be designed to simply use the preference-based solution or a combination of the preference and probability-based solutions when preferences are indicated by a user, but to simply use the probability-based solution where no preferences are indicated. This allows preference-based information to still be utilized even when a large number of the users elect not to specify preferences, or where a user wishes to provide preferences for certain contexts but not others.

Figure 9:
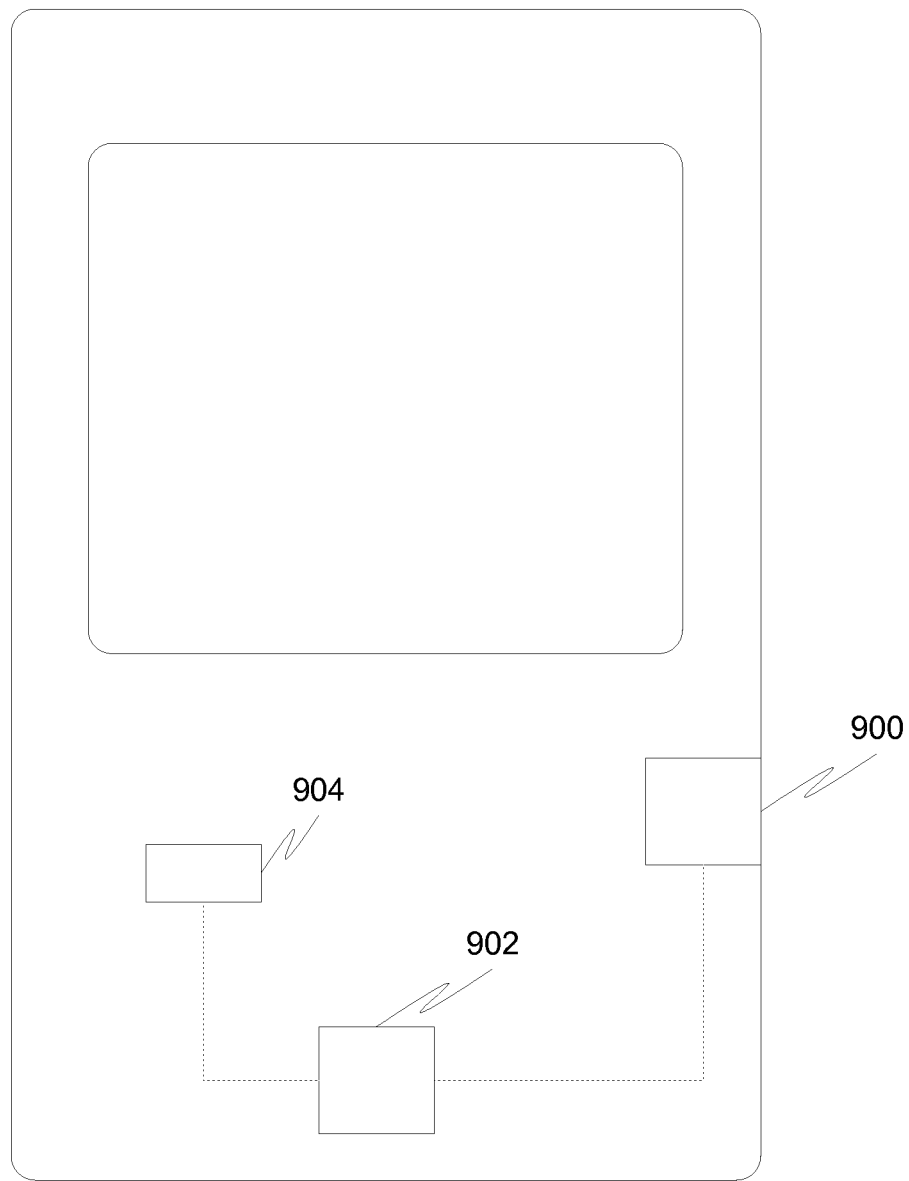
FIG. 9 is a block diagram illustrating a system in accordance with an embodiment of the present invention.

FIG. 9 is a block diagram illustrating a system in accordance with an embodiment of the present invention. In this diagram the system is a mobile device. One of ordinary skill in the art will recognize, however, that the system may be embodied in many different devices or in groups of devices. For example, the system may comprise a mobile device having a processor that performs some of the recited steps and also comprise a server that performs other of the recited steps. In another example, the system may comprise a desktop computer.

The system may include an interface 900 and one or more processors 902. The processors may be configured to perform some or all of the steps recited in FIGS. 4-6 and the corresponding text above. Additionally, when the system includes a mobile device, it may include a load detection module 904. The load detection module may detect the load level of processor 902 (i.e., how busy the processor is). In such a case, the one or more processors may then be configured to perform the storing, and clustering, and determining when the device is not being used or is lightly used and to perform the selecting, computing, and recommending when the actual recommendation is requested by a user.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for making recommendations to a user, the method comprising:
    storing data relating to user usage patterns, wherein the data includes an application portion having information as to items which were used and a context portion having information as to the context in which the items were used, wherein the context is the situation in which the user or device operated by the user is operating when the items were used;
    clustering the data into clusters of data points;
    computing, for each of the clusters, a centroid, wherein the centroid includes an application portion and a context portion;
    selecting at least one cluster similar to a current user context by comparing a data point representing the current user context to the context portions of one or more of the centroids; and
    computing, for each of one or more items, an expectation value of user usage pattern for the corresponding item by selecting data points within the selected similar clusters that have application portions indicating the use of the corresponding item and determining the similarity of the current user context to the context portions of the selected data points, wherein the expectation values are used to recommend one or more of the items.

2. The method of claim 1, wherein the computing is based on the application portions of the centroids of the selected similar clusters.

3. The method of claim 1, further comprising:
    computing, for each of one or more items, a threshold based on values for the application portions of the selected similar clusters.

4. The method of claim 3, wherein the recommending includes comparing the probabilities for each of the one or more items to the thresholds for the corresponding items.

5. The method of claim 1, further comprising:
    computing a threshold based on values for the application portions of the selected similar clusters.

6. The method of claim 5, wherein the recommending includes comparing the probabilities for each of the one or more items to the threshold.

7. The method of claim 1, wherein the context includes the location of the user.

8. The method of claim 1, wherein the context includes the time of day.

9. A method for making recommendations to a user, the method comprising:
storing data relating to user usage patterns, wherein the data includes an application portion having information as to items which were used and a context portion having information as to the context in which the items were used, wherein the context is the situation in which the user or device operated by the user is operating when the items were used;
clustering the data into clusters of data points;
computing, for each of the clusters, a centroid, wherein the centroid includes an application portion and a context portion;
selecting at least one cluster similar to a current user context by comparing a data point representing the current user context and the current items(s) being used to the context portions and application portions of one or more of the centroids; and
computing, for each of one or more items, an expectation value of user usage pattern for the corresponding item by selecting data points within the selected similar clusters that have application portions indicating the use of the corresponding item and determining the similarity of the current user context to the context portions of the selected data points.

10. The method of claim 9, wherein the computing is based on the application portions of the centroids of the selected similar clusters.

11. The method of claim 9, further comprising:
computing, for each of one or more items, a threshold based on values for the application portions of the selected similar clusters.

12. The method of claim 11, wherein the recommending includes comparing the probabilities for each of the one or more items to the thresholds for the corresponding items.

13. The method of claim 9, further comprising:
computing a threshold based on values for the application portions of the selected similar clusters.

14. The method of claim 13, wherein the recommending includes comparing the probabilities for each of the one or more items to the threshold.

15. An apparatus comprising:
an interface; and
one or more processors configured to:
store data relating to user usage patterns, wherein the data includes an application portion having information as to items which were used and a context portion having information as to the context in which the items were used, wherein the context is the situation in which the user or device operated by the user is operating when the items were used;
cluster the data into clusters of data points;
compute, for each of the clusters, a centroid, wherein the centroid includes an application portion and a context portion;
select at least one cluster similar to a current user context by comparing a data point representing the current user context to the context portions of one or more of the centroids; and
compute, for each of one or more items, an expectation value of user usage pattern for the corresponding item by selecting data points within the selected similar clusters that have application portions indicating the use of the corresponding item and determining the similarity of the current user context to the context portions of the selected data points.

16. The apparatus of claim 15, wherein the apparatus is a mobile device.

17. An apparatus comprising:
an interface; and
one or more processors configured to:
store data relating to user usage patterns, wherein the data includes an application portion having information as to items which were used and a context portion having information as to the context in which the items were used, wherein the context is the situation in which the user or device operated by the user is operating when the items were used;
cluster the data into clusters of data points;
compute, for each of the clusters, a centroid, wherein the centroid includes an application portion and a context portion;
select at least one cluster similar to a current user context by comparing a data point representing the current user context and the current items(s) being used to the context portions and application portions of one or more of the centroids; and
compute, for each of one or more items, an expectation value of user usage pattern for the corresponding item by selecting data points within the selected similar clusters that have application portions indicating the use of the corresponding item and determining the similarity of the current user context to the context portions of the selected data points.

18. The apparatus of claim 17, wherein the apparatus is a mobile device.

19. A system for making recommendations to a user, the system comprising:
means for storing data relating to user usage patterns, wherein the data includes an application portion having information as to items which were used and a context portion having information as to the context in which the items were used, wherein the context is the situation in which the user or device operated by the user is operating when the items were used;
means for clustering the data into clusters of data points;
means for computing, for each of the clusters, a centroid, wherein the centroid includes an application portion and a context portion;
means for selecting at least one cluster similar to a current user context by comparing a data point representing the current user context to the context portions of one or more of the centroids; and
means for computing, for each of one or more items, an expectation value of user usage pattern for the corresponding item by selecting data points within the selected similar clusters that have application portions indicating the use of the corresponding item and determining the similarity of the current user context to the context portions of the selected data points.

20. A system for making recommendations to a user, the system comprising:
means for storing data relating to user usage patterns, wherein the data includes an application portion having information as to items which were used and a context portion having information as to the context in which the items were used, wherein the context is the situation in which the user or device operated by the user is operating when the items were used;
means for clustering the data into clusters of data points;

means for computing, for each of the clusters, a centroid, wherein the centroid includes an application portion and a context portion;

means for selecting at least one cluster similar to a current user context by comparing a data point representing the current user context and the current items(s) being used to the context portions and application portions of one or more of the centroids; and means for computing, for each of one or more items, an expectation value of user usage pattern for the corresponding item by selecting data points within the selected similar clusters that have application portions indicating the use of the corresponding item and determining the similarity of the current user context to the context portions of the selected data points.

21. A program storage device readable by a machine tangibly embodying a program of instructions executable by the machine to perform a method for making recommendations to a user, the method comprising:

storing data relating to user usage patterns, wherein the data includes an application portion having information as to items which were used and a context portion having information as to the context in which the items were used, wherein the context is the situation in which the user or device operated by the user is operating when the items were used;

clustering the data into clusters of data points;

computing, for each of the clusters, a centroid, wherein the centroid includes an application portion and a context portion;

selecting at least one cluster similar to a current user context by comparing a data point representing the current user context to the context portions of one or more of the centroids; and computing, for each of one or more items, an expectation value of user usage pattern for the corresponding item by selecting data points within the selected similar clusters that have application portions indicating the use of the corresponding item and determining the similarity of the current user context to the context portions of the selected data points.

22. A program storage device readable by a machine tangibly embodying a program of instructions executable by the machine to perform a method for making recommendations to a user, the method comprising:

storing data relating to user usage patterns, wherein the data includes an application portion having information as to items which were used and a context portion having information as to the context in which the items were used, wherein the context is the situation in which the user or device operated by the user is operating when the items were used;

clustering the data into clusters of data points;

computing, for each of the clusters, a centroid, wherein the centroid includes an application portion and a context portion;

selecting at least one cluster similar to a current user context by comparing a data point representing the current user context and the current items(s) being used to the context portions and application portions of one or more of the centroids; and computing, for each of one or more items, an expectation value of user usage pattern for the corresponding item by selecting data points within the selected similar clusters that have application portions indicating the use of the corresponding item and determining the similarity of the current user context to the context portions of the selected data points.

* * * * *